(12) United States Patent
Kweder et al.

(10) Patent No.: US 8,734,925 B2
(45) Date of Patent: May 27, 2014

(54) HIGH PRESSURE MOLDING OF COMPOSITE PARTS

(75) Inventors: Matthew Kweder, Dublin, CA (US); Bruno Boursier, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 170 days.

(21) Appl. No.: 13/276,650

(22) Filed: Oct. 19, 2011

(65) Prior Publication Data

US 2013/0101406 A1    Apr. 25, 2013

(51) Int. Cl.
B65D 75/06    (2006.01)

(52) U.S. Cl.
USPC .......... 428/35.7; 264/257; 264/258; 264/313; 29/418; 29/448

(58) Field of Classification Search
USPC ............ 428/35.7; 264/257, 258, 313; 29/418, 29/448
See application file for complete search history.

(56) References Cited

U.S. PATENT DOCUMENTS

| | | |
|---|---|---|
| 1,504,547 A | 8/1924 | Egerton |
| 3,032,842 A | 5/1962 | House |
| 4,209,482 A | 6/1980 | Schwarz |
| 4,440,392 A | 4/1984 | Popplewell |
| 4,594,761 A * | 6/1986 | Murphy et al. ............ 29/889.71 |
| 4,927,712 A | 5/1990 | Lhymn et al. |
| 4,962,003 A | 10/1990 | Lhymn et al. |
| 5,176,864 A | 1/1993 | Bates et al. |
| 5,257,922 A | 11/1993 | Vansnick et al. |
| 5,547,629 A | 8/1996 | Diesen et al. |
| 7,063,763 B2 * | 6/2006 | Chapman, Jr. ................ 156/175 |
| 7,960,674 B2 | 6/2011 | Boursier et al. |
| 7,972,548 B2 | 7/2011 | Callis |
| 2006/0017197 A1 | 1/2006 | Christensen et al. |
| 2010/0209235 A1 | 8/2010 | Shim et al. |
| 2011/0091324 A1 | 4/2011 | Holzschuh |

FOREIGN PATENT DOCUMENTS

| | | |
|---|---|---|
| EP | 1559532 A1 | 8/2005 |
| EP | 2179838 A1 | 4/2010 |
| WO | 2005110723 A1 | 11/2005 |

* cited by examiner

*Primary Examiner* — Ellen S Raudenbush
(74) *Attorney, Agent, or Firm* — W. Mark Bielawski; David J. Oldenkamp (57) ABSTRACT

Composite pre-forms are molded at high pressure to form composite parts that can be used in place of metal-based high performance parts, such as the outlet guide vanes found in turbofan jet engines. The composite pre-forms include two different fiber orientations that are co-molded in a resin matrix at high pressures to provide composite outlet guide vanes and other high performance parts. Chambers within the composite part are optionally formed during molding of the pre-form at high pressures.

8 Claims, 4 Drawing Sheets

HIGH PRESSURE MOLDING OF COMPOSITE PARTS

BACKGROUND OF THE INVENTION

1. Field of the Invention

The present invention relates generally to the molding of pre-formed fiber-reinforced resin components into composite parts that have multiple fiber orientations and/or one or more internal chambers. More particularly, the present invention is directed to molding of such pre-forms under high pressure.

2. Description of Related Art

Composite materials typically include fibers and a resin matrix as the two principal components. Composite materials typically have a rather high strength to weight ratio. As a result, composite materials are being used in demanding environments, such as in the field of aerospace where the high strength and relatively light weight of composite parts are of particular importance.

High strength metals and metal alloys have been used in the past to form aircraft parts and structures that are subjected to high stress loads. An advantage of using metal is that, in addition to being extremely strong, metal can be precisely machined so that the geometry of mating parts can be closely matched and tight dimensional tolerances can be met. Holes can also be precisely machined into metal structures to accept high tolerance fasteners and positioning pins.

The turbofan engines that are commonly used to propel aircraft include a number of parts that are subjected to extreme stress and which also must meet precise dimensional tolerances. One example of such a part is the outlet guide vane (OGV). These vanes are airfoil-shaped parts that are located in the by-pass area of a turbofan engine. The outlet guide vanes redirect radial airflow from the forward fan assembly into axial airflow that goes to the turbofan compressor. Each engine can contain as many as 100 or more outlet guide vanes. In order to function properly in this demanding environment, outlet guide vanes have been traditionally made from solid metal or metal alloy. Some outlet guide vanes have been made by surrounding a lighter core material with high-strength metal. More recently, outlet guide vanes have included a metal frame on which composite skins have been mounted. For example, see published U.S. Patent Application No. 2010/0209235 A1. These metal-based outlet guide vanes all tend to be relatively heavy. Accordingly, it would be desirable to provide a lighter-weight outlet guide vane that is made completely from composite material and which has the same structural properties and machining characteristics as the metal-based outlet guide vanes.

Making an outlet guide vane from composite materials presents a number of significant challenges. In order to ensure that the finished part is free of voids or other defects, it is generally necessary to use molding techniques in which pressure is applied to the composite material during the molding process. However, it is very difficult to produce molded composite parts that have tolerances which are as tight as the tolerances that can be obtained by machining a molded metal part. It also is difficult to machine composite parts without creating structural damage. The fibers tend to be disrupted and delamination can occur which greatly reduces the strength of the part. Composite parts that contain unidirectional (UD) fibers are commonly used in many structural parts due to the unique structural and strength properties provided by a UD fiber orientation. The high directional strength provided by UD fibers makes this orientation particularly attractive for use in making outlet guide vanes. However, composite parts that contain UD fibers are particularly difficult to machine without adversely affecting the strength of the part.

Another significant challenge is that the central airfoil of the outlet guide vane and the mounting flanges or platforms that connect the airfoil to the engine have unique and different design requirements. For example, the airfoil needs to be structurally strong to withstand high airflow loads. The flanges must be strong enough to hold the airfoil in place and they must also meet strict dimensional tolerances to provide secure and precise mounting to the engine.

A composite material has been developed that can be machined accurately to strict dimensional tolerances. This composite material is composed of randomly oriented segments of unidirectional tape that have been impregnated with thermosetting resin. This type of quasi-isotropic fiber material has been used to make high pressure molds and a variety of aerospace components. The material is available from Hexcel Corporation (Dublin, Calif.) under the trade name HexMC®. Examples of the types of parts that have been made using HexMC® are described in U.S. Pat. Nos. 7,510,390; 7,960,674 and U.S. patent application Ser. No. 12/856,210.

There is a continuing need to develop new processes and procedures for making composite parts that can be used in place of outlet guide vanes and other high performance parts that have traditionally been made from metal.

SUMMARY OF THE INVENTION

In accordance with the present invention, outlet guide vanes are provided that are made entirely from composite materials. The outlet guide vanes include a molded body that is composed of fiber reinforcement and a cured resin wherein the molded body includes a central airfoil portion and two solid mounting flanges or platforms that form the end portions of the molded body. As a feature of the invention, the fibers located within the central airfoil portion are unidirectional and the fibers located within the end portion are randomly oriented segments of unidirectional fiber tape. It was discovered that these two different fiber orientations could be combined and co-molded in a resin matrix at high pressures to provide composite outlet guide vanes that meet the structural strength and dimensional requirements for both the central airfoil portion and mounting flanges. This discovery that unidirectional fibers and randomly oriented segments of unidirectional tape can be co-molded to provide composite parts with varied localized properties is not limited to outlet guide vanes. Instead, the discovery is applicable to a wide-range of parts where one portion of the part requires the structural strength and stiffness provided by unidirectional fibers and another portion of the part must meet strict dimensional tolerances that typically require machining of the part.

As another feature of the invention, composite outlet guide vanes are provided where the weight of the vane is reduced by forming a hollow chamber inside of the central airfoil portion. The hollow outlet guide vane is made by molding a pre-form that has a shape which closely matches the shape of the outlet guide vane. The pre-form or moldable body is composed of fiber reinforcement and uncured thermosetting resin. The uncured thermosetting resin has a curing temperature at which the resin is converted from a moldable resin to a solid resin having a glass transition temperature ($T_g$) that is well-above the curing temperature. A solid mandrel is located within the pre-form so as to form a chamber inside of the central airfoil portion. The solid mandrel is composed of a material that melts to form a liquid at a melting temperature that is above the curing temperature of the thermosetting resin, but below the glass transition temperature of the cured solid resin. It was discovered that solid mandrels that melt above the curing temperature are required for high pressure molding of combined composites to prevent distortion of the mandrel material and seepage of liquid mandrel material at the high pressures required to provide suitable composite parts. The mandrel material must also melt below the glass transition temperature of the cured part. Otherwise, the mandrel material cannot be melted and removed from the airfoil chamber without damaging the resin matrix of the part.

The discovery that a fusible mandrel can be used in high pressure molding of composite materials to form hollow chambers is also not limited to outlet guide vanes. Instead, the discovery is applicable to a wide range of parts where one or more internal chambers are desired in order to limit weight or to meet some other design requirement.

The present invention covers composite outlet guide vanes as well as other composite parts that employ the above described features of the invention. The invention also covers the pre-forms or moldable bodies that are molded to form the final composite parts. In addition, the invention covers the methods for molding the moldable bodies at high pressure to form the final parts.

The above described and many other features and attendant advantages of the present invention will become better understood by reference to the following detailed description when taken in conjunction with the accompanying drawings.

DETAILED DESCRIPTION OF THE INVENTION

The high pressure molding process of the present invention may be used to fabricate a wide variety of composite parts where it is desirable to combine unidirectional fibers and randomly oriented segments of unidirectional tape in a single part to meet various structural requirements while at the same time also meeting various dimensional tolerances. The process may also be used to locate one or more chambers within the composite part. The invention is directed to high-pressure molding of pre-forms that are composed of uncured thermosetting resin and fibrous reinforcement. High pressure molding utilizes pressures in the mold of 500 psi to 2000 psi.

Examples of composite parts that can be made using the molding process of the present invention include outlet guide vanes for jet engines, thrust reverser cascades, various engine airfoils, access doors, brackets, flanges and stiffeners for aerospace structures. The following detailed description is directed to processes and procedures for molding outlet guide vanes from resin impregnated pre-forms. However, it will be understood that the processes and procedures described herein may be used to make other similar solid and chambered composite parts.

Figure 1:
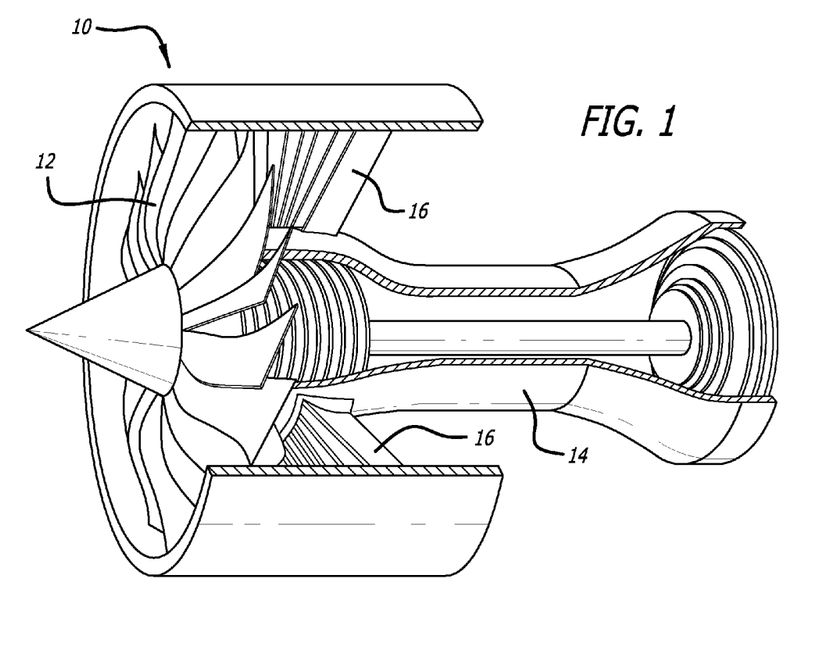
FIG. 1 is a simplified view of a jet engine that shows where the outlet guide vanes are located within the jet engine.

A simplified turbofan jet engine is shown generally at 10 in FIG. 1. The turbofan jet engine 10 includes a fan assembly 12 that is located ahead of the turbofan jet engine core 14. Airflow that is discharged from the fan assembly 12 is channeled to a compressor in the core 14 where it is further compressed. The compressed air is channeled into a combustor where it is mixed with fuel and ignited to form hot combustion gases. The combustion gases are channeled to a turbine that extracts energy from the gases to power the compressor and produce power for propelling the aircraft. Outlet guide vanes 16 are placed in the turbofan jet engine 10 to redirect the radial air discharged from the fan assembly 12 into axial air flow in the bypass area of the turbofan jet engine 10. The outlet guide vanes 16 include a central airfoil portion that is located between mounting flanges. The flanges are used to securely connect the outlet guide vanes 16 to the turbofan jet engine.

Figure 2:
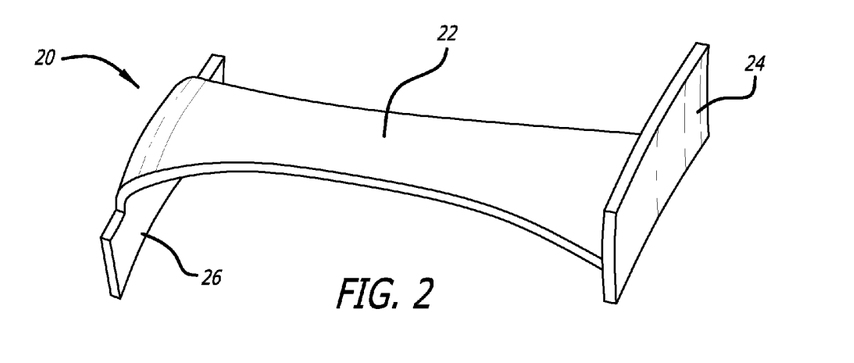
FIG. 2 is a perspective view of an exemplary outlet guide vane that includes a hollow central airfoil portion made from resin impregnated unidirectional fibers and two solid flange end portions that are made from resin impregnated segments of unidirectional tape that are randomly oriented.
Figure 3:
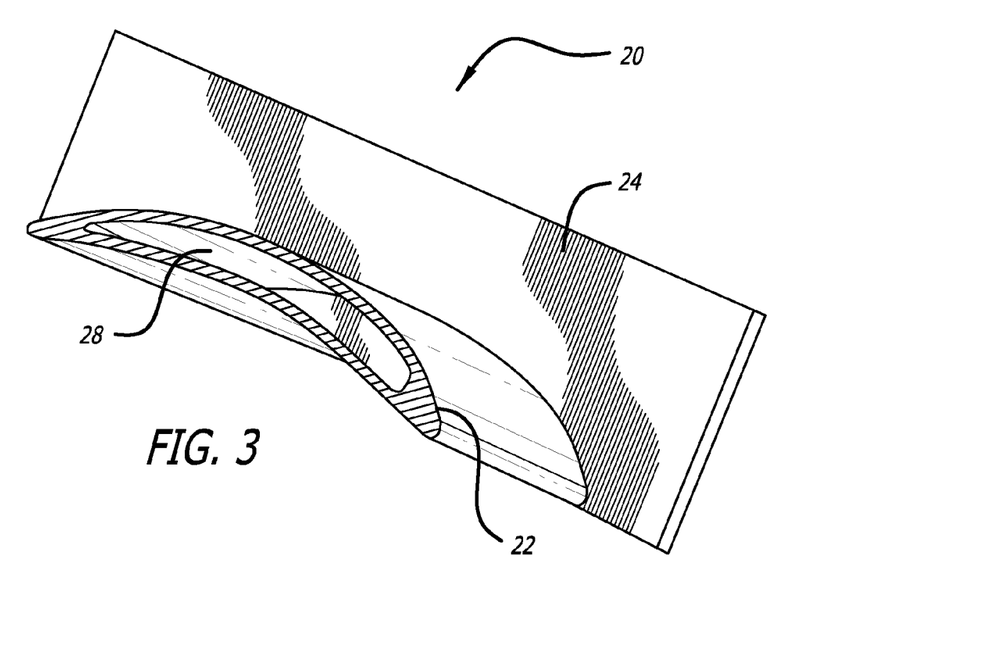
FIG. 3 is a sectional view of a hollow central airfoil portion in accordance with the present invention where there is a single chamber.
Figure 4:
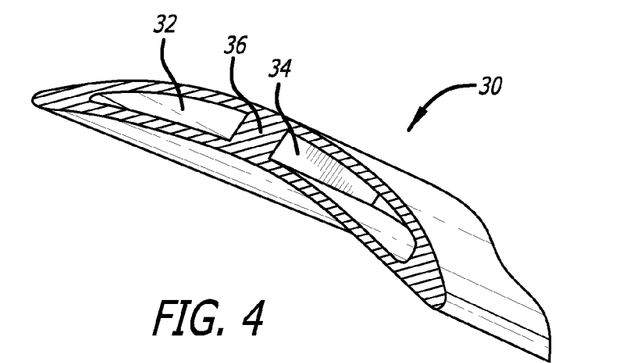
FIG. 4 is a sectional view of a hollow central airfoil portion in accordance with the present invention where there are two chambers that are separated by a central spar.

An exemplary all composite outlet guide vane is shown at 20 in FIG. 2. Outlet guide vane 20 includes a hollow central airfoil portion 22 and two solid flanges 24 and 26 for attaching the airfoil 22 to the turbine engine. As shown in FIG. 3, the airfoil portion 22 includes a chamber 28 that is formed during the molding process. An alternate exemplary all composite outlet guide vane 30 is shown in FIG. 4. The outlet guide vane 30 includes two chambers 32 and 34 which are separated by a centrally located spar 36 that runs the length of the airfoil portion. A third exemplary outlet guide vane is shown at 60 in FIG. 6. The outlet guide vane 60 has a solid central airfoil 62 and solid flanges (not shown). The outlet guide vane 60 also includes a protective metal shield 64 that is bonded to the leading edge of the vane.

Figure 8:
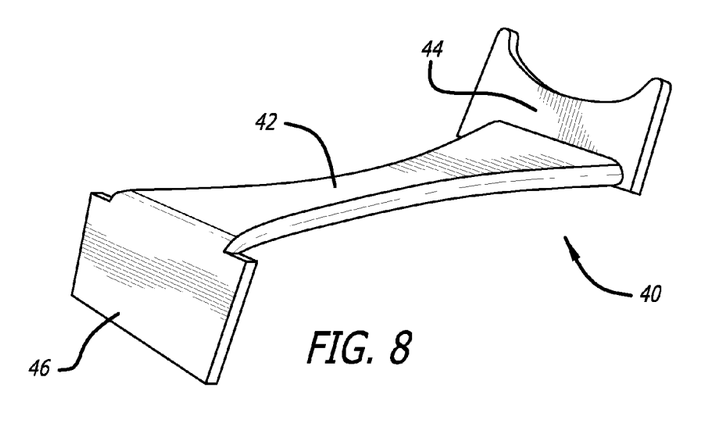
FIG. 8 is an outlet guide vane pre-form that has been formed on the fusible mandrel shown in FIG. 7. The pre-form is made up of a combination of unidirectional fibers in the central airfoil portion and randomly oriented segments of unidirectional fiber tape and a thermosetting resin that cures at 196° C.

In accordance with the present invention, the outlet guide vanes are made by high-pressure molding of a composite pre-form or moldable body that is a composite material composed of uncured resin and fiber reinforcement. In FIG. 8, an exemplary pre-form 40 is shown that can be molded to form the outlet guide vane. The pre-form 40 is shaped to closely resemble the final outlet guide vane. An example of an outlet guide vane is 20 cm long and 5 cm wide with thicknesses of the airfoil portion varying from 0.1 to 0.5 cm. For such an outlet guide vane, the pre-form should be undersized from 0.2 to 1.5 cm in all dimensions, except for thickness. The pre-form 40 has a central airfoil portion 42, which may or may not include a fusible metal mandrel depending on whether a hollow airfoil is desired. The pre-form also includes solid end portions or flanges 44 and 46.

The uncured resin used in the pre-form 40 may be composed of any of the thermosetting or thermoplastic resins that are typically used for structural applications. Preferably, the amount of uncured resin matrix will be between 25 to 45 weight percent of the overall weight of the pre-form. The uncured resin matrix may be any of the epoxy resins, bismaleimide resins, polyimide resins, polyester resins, vinylester resins, cyanate ester resins, phenolic resins or thermoplastic resins that are used in structural composite materials. Exemplary thermoplastic resins include polyphenylene sulfide (PPS), polysulfone (PS), polyetheretherketone (PEEK), polyetherketoneketone (PEKK), polyethersulfone (PES), polyetherimide (PEI), polyamide-imide (PAI). Epoxy resins that are toughened with a thermoplastic, such as PES, PEI and/or PAI, are preferred resin matrices. Resins that are typically present in UD tape of the type used in the aerospace industry are preferred. Exemplary thermoplastic toughened resins that are suitable for use as the resin matrix are described in U.S. Pat. Nos. 7,754,322 and 7,968,179 and U.S. patent application Ser. No. 12/764,636.

Thermoplastic resins cannot be used when chambers are to be formed in the part using a fusible mandrel in accordance with the present invention. Thermoplastic resins do not cure to form a solid resin that has a glass transition temperature which is sufficiently above the curing temperature to allow melting and removal of the fusible mandrel without damaging the thermoplastic part. Accordingly, thermosetting resins must be used when forming one or more chambers in the composite part. Thermosetting resins that are toughened with a thermoplastic may be used to form chambered parts. Epoxy resins that are toughened with thermoplastic are preferred.

The uncured resin and fiber reinforcement may be added to the pre-form separately. However, it is preferred that the fibers be pre-impregnated with resin prior to being used to make the pre-form. Such pre-impregnated fibers are commonly referred to as "prepreg". The pre-form is prepared by forming pieces of prepreg into the desired pre-form shape. When a fusible mandrel is used, the various pieces of prepreg are placed uniformly around the mandrel.

Randomly oriented segments of unidirectional tape that are impregnated with resin are commonly referred to as quasi-isotropic chopped prepreg. Quasi-isotropic chopped prepreg is a form of random discontinuous fiber composite (DFC) that is available commercially from Hexcel Corporation (Dublin, Calif.) under the trade name HexMC®. As previously mentioned, HexMC® has been used for a variety of purposes including aerospace articles and high-strength molds.

Quasi-isotropic (Q-I) prepreg is composed of segments or "chips" of unidirectional fiber tape and a resin matrix. Q-I prepreg is typically supplied as a mat made up of randomly oriented chips of chopped unidirectional tape prepreg. The size of the chips may be varied as well as the type of fibers depending upon the size and shape of the pre-form as well as how precisely the pre-form must be machined to meet dimensional tolerances, if any. It is preferred that the chips be ⅓ inch wide, 2 inches long and 0.006 inch thick. The chips include unidirectional fibers that can be carbon, glass, aramid, polyethylene or any of the fibers types that are commonly used in the aerospace industry. Carbon fibers are preferred. The chips are randomly oriented in the mat and they lay relatively flat. This provides the mat with its transverse isotropic properties.

The UD tape prepreg that is chopped to form the chips or segments includes a resin matrix that can be any of the resins mentioned previously that are commonly used in aerospace prepregs. Thermosetting epoxy resins that are toughened with thermoplastics are preferred because they tend to be more resistant to fracturing or delamination if machining of the final composite part is required. The resin content of the chips may also be varied between 25 and 45 weight percent of the total prepreg weight. Chips with resin contents of between 35 and 40 weight percent are preferred. No additional resin is typically added to the prepreg chips when forming the quasi-isotropic chopped prepreg. The resin present in the initial UD tape prepreg is sufficient to bond the chips together to form the mat.

The quasi-isotropic (Q-I) chopped prepreg can be made by purchasing or making unidirectional prepreg tape or tow of desired width. The tape or tow is then chopped into chips of desired length and the chips are laid randomly in layers to form the solid portions of the pre-form or laid randomly in uniform layers around the mandrel in those portions of the pre-form that are chambered. The randomly placed UD prepreg chips are pressed together to form the pre-form. The pre-form may be composed entirely of Q-I prepreg chips when a mandrel is present in the pre-form. Otherwise, the randomly oriented UD prepreg chips are used to form only a portion of the pre-form with the other portion being composed of UD prepreg and/or other fiber orientations. When pressed together, the individual randomly oriented UD prepreg chips inherently bond together due to the presence of the prepreg resin. The preferred method, however, is to purchase HexMC® or equivalent commercially available quasi-isotropic chopped prepregs, which are supplied as sheets of material that are then used to form the solid portions of the pre-form and/or the chambered portions of the pre-form.

An exemplary preferred quasi-isotropic chopped prepreg material is HexMC® 8552/AS4. This quasi-isotropic chopped prepreg material is supplied as a continuous roll of a mat that is 46 cm wide and 0.20 cm thick. HexPly® 8552/AS4 unidirectional fiber prepreg is used to make the chips that are randomly oriented in the quasi-isotropic mat. HexPly® 8552/AS4 prepreg is a carbon fiber/epoxy unidirectional tape that is 0.016 cm thick and has a fiber areal weight of about 145 grams/square meter. The resin content of the tape is 38 weight percent with the resin (8552) being a thermoplastic-toughened epoxy. The tape is slit to provide 0.85 cm strips and chopped to provide chips that are 5 cm long. The chip density is about 1.52 gram/cubic centimeter. Other exemplary quasi-isotropic chopped prepreg can be made using other HexPly® unidirectional prepreg tape, such as EMC 116/AS4 (epoxy/carbon fiber), 8552/IM7 (thermoplastic-toughened epoxy/carbon fiber), 3501-6/T650 (epoxy/carbon fiber) and M21/IM7 (thermoplastic-toughened epoxy/carbon fiber). HexMC® 8552/AS4 and M21/IM7 are preferred quasi-isotropic chopped prepregs for use alone, or in combination with other fiber orientations, to form the pre-forms in accordance with the present invention.

Woven fiber fabric and other fiber orientations may be used in combination with the randomly oriented UD prepreg chips to make the pre-form. However, it is preferred that unidirectional fibers are used. The UD fibers may contain from a few hundred filaments to 12,000 or more filaments. UD fibers are typically supplied as a tape made up of continuous fiber in a unidirectional orientation. UD tape is the preferred type of prepreg that is used to form the fibrous structure. Unidirectional tape is available from commercial sources or it may be fabricated using known prepreg formation processes. The dimensions of the UD tape may be varied widely depending upon the particular composite part being made. For example, the width of the UD tape (the dimension perpendicular to the UD fibers) may range from 0.5 inch to a foot or more. The tape will typically be from 0.004 to 0.012 inch (0.01 to 0.03 cm) thick and the length of the UD tape (the dimension parallel to the UD fibers) may vary from 0.5 inch (1.3 cm) up to a few feet (one meter) or more depending upon the size and shape of the pre-form and the particular orientation of each piece of UD tape within the pre-form.

A preferred exemplary commercially available unidirectional prepreg is HexPly® 8552, which is available from Hexcel Corporation (Dublin, Calif.). HexPly®8552 is available in a variety of unidirectional tape configurations that contain an amine cured toughened epoxy resin matrix in amounts ranging from 34 to 38 weight percent and carbon or glass UD fibers having from 3,000 to 12,000 filaments. The fibers typically account for 60 volume percent of the UD tape. The preferred UD fibers are carbon fibers.

Figure 6:
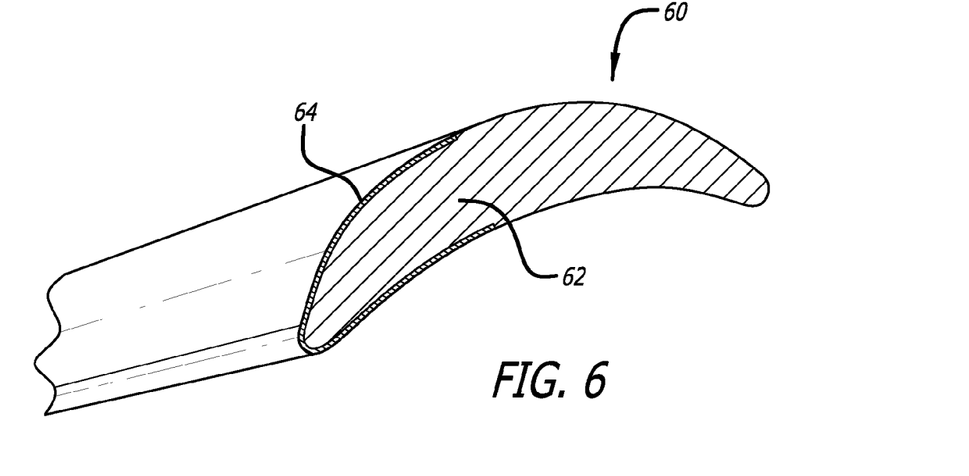
FIG. 6 is a sectional view of a solid outlet guide vane in accordance with the present invention where a protective metal layer has been adhered to the leading edge of the central airfoil portion during molding of the outlet guide vane.

When making a solid outlet guide vane of the type shown at 60 in FIG. 6, UD tape prepreg is laid longitudinally to form a solid airfoil portion where the UD fibers extend between the mounting flanges on either end of the airfoil. The pre-form flanges are formed using randomly oriented UD prepreg chips. The two fiber orientations should be overlapped to provide a strong junction. For example, the randomly oriented UD prepreg chips can be placed so that they extend into the airfoil portion and overlap the UD tape prepreg at the ends of the airfoil portion. The degree of overlap should be sufficient to eliminate any voids or resin-rich areas that could lead to cracking at the junction between the UD fibers in the airfoil and the randomly oriented UD prepreg chips that make up the flanges. It is more preferred that the UD fibers are extended into the flange portions to provide the needed overlap. In either case, it is preferred that the various layers of UD prepreg and UD prepreg chips are interleaved in alternating layers to provide maximum strength at the joint where the two different fiber orientations meet and are overlapped.

Figure 5:
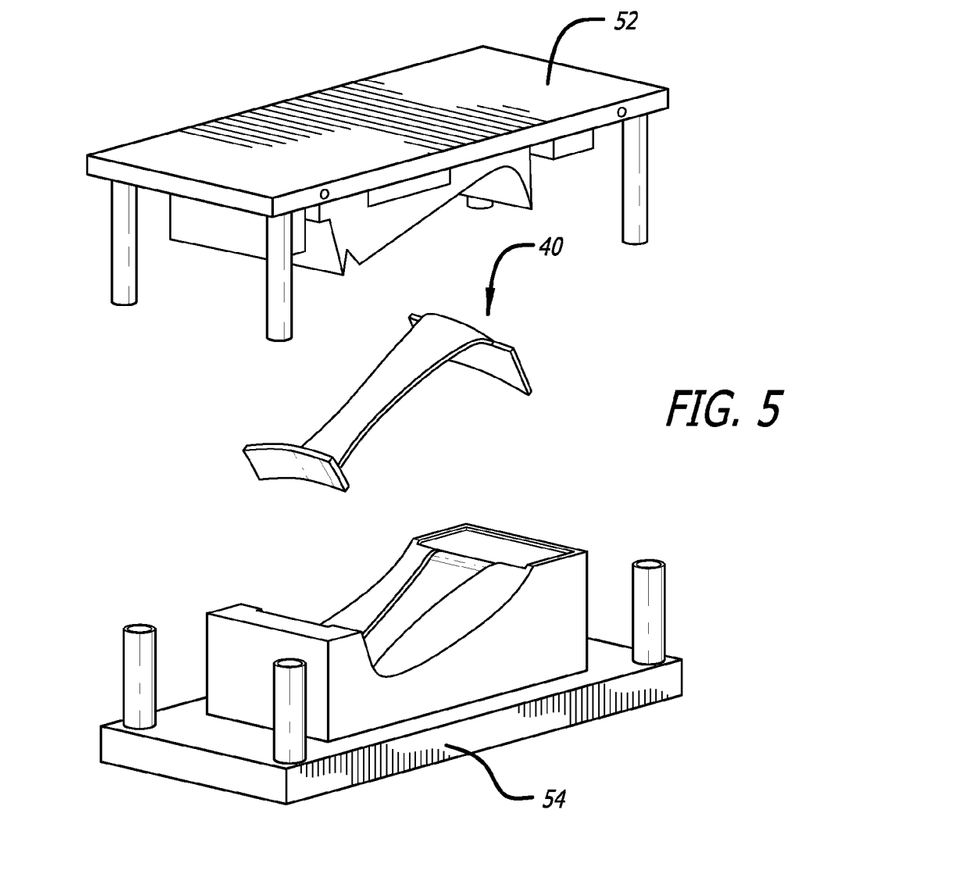
FIG. 5 is a view of a outlet guide vane pre-form as it is being place between two mold halves for molding to form an outlet guide vane.

As shown in FIG. 5, the solid pre-form is placed between two mold halves 52 and 54 and heated to the curing temperature of the resin and molded at high pressure to form the outlet guide vane 60. Typical high-pressure curing temperatures for epoxy resins range from 170° C. to 225° C. Preferred curing temperatures range from 190° C. to 205° C. Internal pressures within the mold are preferably above 500 psi and below 2000 psi at the cure temperatures. Once the pre-form has been completely cured (typically 10 minutes to 1 hour at curing temperature), the part is removed from the mold and cooled to form the final part. If required, the flanges or platforms may be machined to form the final flange shape and provide any precise dimensions that are required.

Preferably, the pre-form is "staged" prior to being placed in the mold in order to increase the viscosity of the resin to help maintain the pre-form shape and keep the mandrel in place during subsequent high pressure molding. Staging involves heating the pre-form at ambient pressure to a temperature of 165° C. to 180° C. for just enough time to substantially increase the viscosity of the resin. Staging times on the order of 5 to 15 minutes at the staging temperature are preferred. The staged pre-form is preferably cooled to room temperature prior to being placed in the mold for final curing. In addition, the viscosity of the resin in the pre-form tends to drop as the pre-form is heated to cure temperature and then rapidly increases as the resin cures. It is preferred that the mold not be pressurized until after the resin has reached the minimum viscosity. In practice, the staged pre-form is placed in the mold, which has already been heated to the curing temperature. Pressurization of the mold is delayed from a few seconds to a minute or more in order to allow the resin time to move through the minimum viscosity phase. This delay in pressurization is particularly preferred for pre-forms that include a fusible mandrel for forming internal chambers in order to limit movement of the mandrel when pressure is applied.

Figure 7:
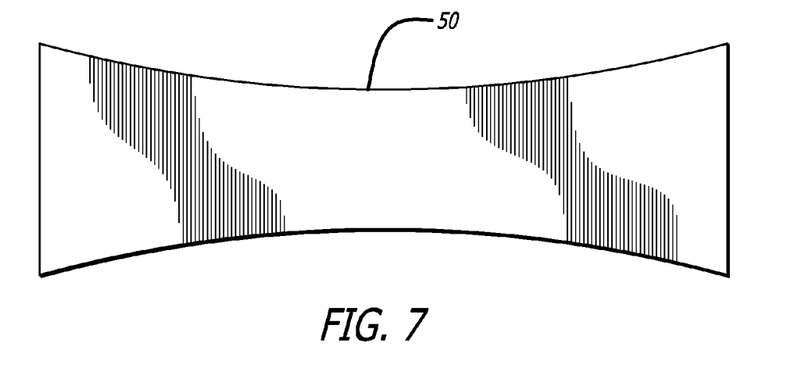
FIG. 7 is a fusible mandrel for use in forming the chamber within the outlet guide vane airfoil. The mandrel is made from a tin-zinc eutectic alloy.

The method for forming outlet guide vanes that have hollow internal chambers is basically the same as the method described above for making solid outlet guide vanes. The difference being that a fusible mandrel as shown at 50 in FIG. 7 is placed in the center of the airfoil portion of the pre-form. The fusible mandrel should be a material that has a melting point which is above the curing temperature of the uncured resin, but below the glass transition temperature of the cured resin. It is possible to use high-temperature waxes of the type that have been used in the past in "lost-wax" metal molding procedures. However, the preferred fusible mandrel is made from a eutectic metal alloy that melts over a relative narrow range (1 to 5° C.) and has a melting point that is at least 1° C. above the temperature used to cure the resin and preferably at least 5° C. above the temperature used to cure the resin. The upper end of the melting point range of the fusible material should be at least 1° C. below the glass transition temperature of the cured resin and preferably at least 5° C. below the glass transition temperature of the cured resin.

Exemplary eutectic metal alloys that can be used to form the fusible mandrel include eutectic mixtures of tin with zinc and/or bismuth that have the above-mentioned melting properties. A preferred eutectic metal alloy for use as a fusible mandrel contains 91 weight percent tin and 9 weight percent zinc. This tin/zinc alloy has a melting point of 199° C. Other eutectic metal alloys may be used provided that they meet the melting point requirements set forth above. Eutectic metal alloys can be made from the base metals or can be purchased from commercial suppliers, such as Kapp Alloy & Wire, Inc. (Oil City, Pa.)

The pre-form is shaped around the fusible mandrel using the prepreg types discussed previously. Although the pre-form can be composed entirely of randomly oriented segments of UD tape, it is preferred that the pre-form include UD tape prepreg in the airfoil portion and randomly oriented segments of UD tape in the flanges as described above for the solid outlet guide vane. The fusible mandrel should be located in the pre-form so that it is surrounded by equal thicknesses of prepreg material. It was found that the high pressures used during the molding process can cause shifting of the mandrel if it is not surrounded by equal amounts of prepreg.

After the pre-form containing the mandrel has been cured, it is heated further to a temperature that is sufficient to melt the fusible material, so that it can drain out of the part through a hole that has been drilled in the part. The part is cooled down after the melted fusible material has been drained to form an outlet guide vane that includes a hollow chamber in the airfoil portion. The fusible mandrel 50 is shaped to provide a single hollow chamber 28 as shown in FIG. 3. If desired, multiple fusible mandrels may be located inside the pre-form to provide multiple hollow chambers of the type shown at 32 and 34 in FIG. 4. The formation of multiple chambers is preferred where it is desirable to provide additional structural strength to the airfoil portion in the form of a spar 36 in FIG. 4 or other type of rib structure. The multiple mandrels should also be surrounded by equal amounts of prepreg material in the pre-form in order to prevent unwanted shifting of the mandrels during high pressure curing. In addition, a drain hole is required for each mandrel to allow draining of the melted mandrel material from the chambers that are formed during molding of the part.

As previously mentioned, erosion protection can be added to the leading edge of the outlet guide vane in the form of a thin sheet of protective metal 64 as shown in FIG. 6. The sheet of metal should be 0.001 to 0.010 inch thick and should be made from a suitably strong and abrasion resistant metal or metal alloy. Stainless steel, titanium and other similar high-strength metal alloys are suitable. As a feature of the invention, the protective metal sheet is placed in position on the pre-form prior to molding of the pre-form. The protective sheet is adhered to the pre-form using a thermoplastic adhesive that has a softening temperature that is relatively low. Softening temperatures on the order of 110° C. to 130° C. are preferred. It was discovered that during cool-down of the molded part, the metal protective sheet has a tendency to debond from the composite airfoil portion. This problem is avoided by using an adhesive that does not solidify until the part has cooled down substantially from the cure temperature or the melting temperature of the mandrel when chambered parts are being made. It was discovered that keeping the adhesive in a non-solid state during as much of the cool-down as possible substantially reduces the tendency of the protective metal to debond from the composite airfoil.

Exemplary adhesives that can be used to bond the leading edge protective sheet to the outlet guide vane include polyolefin adhesives that have a softening point of around 123° C. and polyamide adhesives that have softening point of around 116° C. Suitable polyolefin adhesives are available from BEMIS (Shirley, Mass.) under the trade name BEMIS 6343. Suitable polyamide adhesives are also available from BEMIS (Shirley, Mass.) under the trade name BEMIS 4220.

Examples of practice are as follows:

Example 1

A pre-form of the type shown at 40 in FIG. 8 was prepared in order to produce an outlet guide vane of the type shown at 20 in FIGS. 2 and 3. The outlet guide vane had an airfoil portion that was 9 inches tall and ranged in width from 2 inches to 4 inches. The thickness of the airfoil ranged from 0.040 inch to 0.250 inch. The flanges were each about 5 inches wide, 2 inches long and 0.230 inch thick. A mandrel of the type shown at 50 in FIG. 7 was prepared from a eutectic metal alloy composed of 91 weight percent tin and 9 weight percent zinc (melting point—199° C.). The airfoil portion of the pre-form was prepared by covering the mandrel with AS4/8552HexPly® unidirectional tape prepreg that had a resin content of 38 weight percent. The UD tape was laid so that it extended longitudinally between the flanges or platforms and overlapped into the flanges by about 1.5 inch. The flange portions of the pre-form were made from AS4/8552 HexMC® that had a resin content of 38 weight percent. The overlapping sections of the UD tape were interleaved with the layers of HexMC®. The pre-form was formed to closely resemble the outlet guide vane with the pre-form being undersized by 0.25 inch in all dimensions, except the thickness of the airfoil portion. The mass of the combined resin and fibers in the pre-form amounted to 103 weight percent of the desired outlet guide vane weight to account for weight loss due to resin flashing during the curing process. It is preferred that the mass of the pre-form be from 101 to 110 weight percent of the desired outlet guide vane weight.

The pre-form was initially placed in a thin gauge perforated sheet metal tool that closely resembled the curing mold in order to maintain the shape of the pre-form during staging of the resin. The tool-supported pre-form was placed in an oven at 177° C. under ambient pressure for 9 minutes to stage the resin and increase the minimum viscosity. The staged pre-form was cooled to room temperature and the sheet metal tooling removed. The staged pre-form was then placed in a compression mold of the type shown at 52 and 54 in FIG. 5. The mold had been pre-heated to a temperature of 196° C. Upon placement into the mold, the pre-form became molten and passed minimum viscosity within about 90 seconds. After the initial 90 seconds, the mold was pressurized to 1500 psi. The mold was held at this pressure and temperature for 20 minutes, after which the part was ejected. A hole was then drilled through the part and into the chamber formed by the mandrel. The part was then heated to 204° C. and kept there until the eutectic metal alloy was melted and drained from the chamber. The part was then cooled and subjected to a variety of tests including compression testing. The predictive modal analysis of the outlet guide vane was found to match very closely the results of the modal testing. In addition, the lay-up and construction of the outlet guide vane could be adapted to avoid undesirable natural frequency response to the outlet guide vane based on specific engine characteristics. The composite outlet guide vane was found to meet typical structural requirements of outlet guide vanes in compressive strength, resistance to buckling, fatigue resistance and natural frequency in the free-state condition. If necessary, the flanges or platforms can be machined to remove flange material to meet design and/or dimensional tolerance requirements. Machining of the airfoil portion is not possible, since it would result in unacceptable damage to the UD fibers that make up the airfoil.

Example 2

An outlet guide vane is prepared in the same manner as Example 1, except that the entire pre-form is made from AS4/8552 HexMC® that has a resin content of 38 weight percent. The pre-form is staged and cured in the same manner as Example 1. The eutectic metal mandrel is melted and removed as in Example 1 and the part is cooled to provide an all composite chambered outlet guide vane. This all composite part can be machined in all areas to meet design and dimensional tolerances. The part is also expected to be equal to comparative metal outlet guide vanes in compressive strength, resistance to buckling, fatigue resistance and natural frequency in the free-state condition.

Example 3

A solid outlet guide vane of the type shown at 60 in FIG. 6 was made in the same manner as Example 1, except that the mandrel was eliminated and AS4/8552HexPly® unidirectional tape prepreg was used instead to provide a solid airfoil portion that was composed entirely of unidirectional fibers. In addition, the leading edge of the pre-form was covered with a protective sheet of 316 stainless steel that was 0.004 inch thick. A thin layer of BEMIS 4220 polyamide adhesive was located between the protective sheet and the leading edge of the composite pre-form. The pre-form was molded in the same manner as Example 1, except that the extra heating step to remove the fusible mandrel was not required. The resulting solid outlet guide vane was also found to be better than comparative metal outlet guide vanes in compressive strength and resistance to buckling. Although the hollow and solid outlet guide vanes have the same geometry, they can be used to meet different structural requirement as needed depending on their location within the engine. The solid outlet guide vanes are stronger overall, but weigh more than the hollow outlet guide vanes. The weight of the airfoil portion of the solid outlet guide vane is as much as twice that of the hollow outlet guide vane. The protective stainless steel sheet remained securely bonded to the leading edge of the final outlet guide vane.

Comparative Example 1

A pre-form was prepared in the same manner as Example 1, except that the mandrel was made from a eutectic metal alloy composed of 50 weight percent tin and 50 weight percent bismuth. This eutectic metal alloy had a melting point of 138° C. The pre-form was molded in the same manner as Example 1, except that the mold temperature was 200° C. Since the mold curing temperature was above the melting point of the eutectic metal alloy, the mandrel melted during the molding step. When the mold was pressurized to 1500 psi, liquid eutectic metal alloy was squeezed through the resin and fibers and out between the mold halves. As a result, the internal chamber within the pre-form collapsed.

Comparative Example 2

A pre-form was prepared in the same manner as Example 1, except that more UD prepreg tape was placed on one side of the mandrel than on the other. The unbalanced pre-form was then molded in the same manner as Example 1. During the molding step, the high pressure in the mold caused the extra prepreg on one side of the mandrel to exert excessive force against the side of the mandrel that was lacking in prepreg. This unbalanced force in the mold caused the mandrel to be shifted and distorted. Accordingly, as mentioned previously, it is preferred that the amount of prepreg material in the pre-form be balanced around the mandrel to prevent shifting and distortion of the mandrel at the high pressures which are required to properly form high performance parts, such as outlet guide vanes.

Having thus described exemplary embodiments of the present invention, it should be noted by those skilled in the art that the within disclosures are exemplary only and that various other alternatives, adaptations and modifications may be made within the scope of the present invention. For example, the invention may be used to make a variety of solid and chambered high performance parts where a combination of strength, machinability and light weight are required. In addition, the hollow chamber, which is formed when the fusible mandrel is melted and removed from the part, can be injection-filled with a foam or other filler material that provides a desired property to the part, such as natural frequency dampening and acoustic dampening. Accordingly, the present invention is not limited by the above-described embodiments, but is only limited by the following claims.

What is claimed is:

1. A moldable structure comprising:
a moldable body comprising:
  a central portion comprising unidirectional fiber reinforcement and an uncured thermosetting resin that has a curing temperature at which said uncured thermosetting resin is converted from a moldable resin to a solid resin having a glass transition temperature that is above said curing temperature, said central portion comprising an internal surface that defines a chamber located within said central portion;
  solid end portions located at each end of said central portion, said end portions comprising randomly oriented segments of unidirectional fiber tape; and
a solid mandrel located within said chamber, said solid mandrel being in contact with said internal surface to provide shape thereto, said solid mandrel comprising a material having a melting point at which said solid mandrel material melts to form a liquid material that can be drained out through a hole in said internal surface, said melting point being above said curing temperature and below said glass transition temperature.

2. A moldable structure according to claim 1 wherein the curing temperature of said uncured thermosetting resin is between 170° C. and 225° C.

3. A composite part comprising a moldable structure according to claim 1 that has been molded to form said composite part and wherein said solid mandrel has been melted to form said liquid and wherein said liquid material has been drained from said chamber.

4. A moldable structure according to claim 2 wherein said solid mandrel material comprises a eutectic metal alloy.

5. A moldable structure according to claim 1 wherein said moldable structure is in the shape of an outlet guide vane.

6. A composite part according to claim 3 wherein said composite part is an outlet guide vane.

7. A moldable structure according to claim 4 wherein said eutectic metal alloy comprises tin and zinc or bismuth.

8. A moldable structure according to claim 7 wherein said eutectic metal allow is composed of 91 weight percent tin and 9 weight percent zinc.

* * * * *